(12) United States Patent
Rak et al.

(10) Patent No.: US 7,627,335 B2
(45) Date of Patent: *Dec. 1, 2009

(54) COVER PLATE FOR A MOBILE DEVICE HAVING A PUSH-THROUGH DIAL KEYPAD

(75) Inventors: Roman Peter Rak, Waterloo (CA); Jason Griffin, Waterloo (CA); Steven Fyke, Fort Erie (CA); Paul Robert Chyc, Cambridge (CA)

(73) Assignee: Research In Motion Limited, Waterloo, Ontario (CA)

( * ) Notice: Subject to any disclaimer, the term of this patent is extended or adjusted under 35 U.S.C. 154(b) by 224 days.

This patent is subject to a terminal disclaimer.

(21) Appl. No.: 11/536,268

(22) Filed: Sep. 28, 2006

(65) Prior Publication Data

US 2007/0120710 A1    May 31, 2007

Related U.S. Application Data

(63) Continuation of application No. 10/889,025, filed on Jul. 13, 2004, now Pat. No. 7,133,707.

(30) Foreign Application Priority Data

Aug. 7, 2003    (GB) ................................. 0318534.5

(51) Int. Cl.
*H04M 1/10* (2006.01)
(52) U.S. Cl. ........................ 455/466; 455/550; 455/557; 455/566; 455/575; 379/433.01; 379/433.04; 370/368
(58) Field of Classification Search ................. 379/368; 348/14.01; 455/90.1, 550.1; 341/22
See application file for complete search history.

(56) References Cited

U.S. PATENT DOCUMENTS 6,320,963 B1    11/2001    Whitney (Continued)

FOREIGN PATENT DOCUMENTS

DE    10017838    2/2001

(Continued)

OTHER PUBLICATIONS

Canadian Intellectual Property Office, Feb. 7, 2008 Office Action, Canadian Patent Application No. 2,473,331.

(Continued)

*Primary Examiner*—Patrick N. Edouard
*Assistant Examiner*—Julio R Perez
(74) *Attorney, Agent, or Firm*—Borden Ladner Gervais LLP; Jeffrey W. Wong

(57) ABSTRACT

A mobile electronic device having a keyboard has a cover plate acting as a dial keypad. The keypad has a push-through, hinge-spring design that activates only one of two keyboard keys underlying a dial key and allows backlighting transmissivity. A translucent material can be used to allow the keyboard key backlighting to be coupled through to a top dial key. The keypad creates an aesthetically balanced dial keypad arrangement over a QWERTY keyboard. A preferable mechanical implementation allows backlighting and has an offset contact and spring design to activate one of the two underlying keys. This activation simplifies the software implementation for executing the dial number since the signal is coming from one address rather than having to make a determination of whether it is coming from one or two addresses. Moreover, the resulting dial key press has a standard single click feel.

10 Claims, 6 Drawing Sheets

U.S. PATENT DOCUMENTS

| | | | |
|---|---|---|---|
| 6,812,954 B1* | 11/2004 | Priestman et al. | 348/14.01 |
| 2001/0003539 A1* | 6/2001 | Hahm et al. | 379/368 |
| 2002/0080122 A1 | 6/2002 | Ostergard et al. | |
| 2003/0017839 A1 | 1/2003 | Mager | |
| 2003/0052964 A1 | 3/2003 | Priestman et al. | |
| 2003/0119543 A1 | 6/2003 | Kfoury et al. | |

FOREIGN PATENT DOCUMENTS

| | | |
|---|---|---|
| EP | 0776140 | 5/1997 |
| WO | 9810571 | 3/1998 |
| WO | 9840997 | 9/1998 |
| WO | 0122697 | 3/2001 |
| WO | 0195358 | 12/2001 |

OTHER PUBLICATIONS

Canadian Intellectual Property Office Office Action of Jun. 18, 2008 for corresponding Canadian Application No. 2,473,331.

* cited by examiner

COVER PLATE FOR A MOBILE DEVICE HAVING A PUSH-THROUGH DIAL KEYPAD

REFERENCE TO RELATED APPLICATION

This is a continuation of application Ser. No. 10/889,025, now U.S. Pat. No. 7,133,707 filed Jul. 13, 2004.

FIELD OF THE INVENTION

The present invention relates generally to keyboards and keypads for mobile devices. More particularly, the present invention relates to a keyboard and keypad arrangement for a mobile device.

BACKGROUND OF THE INVENTION

Many mobile devices, such as cellular telephones, personal digital assistants (PDAs), and other handheld and wireless computing and communicating devices, currently perform numerous and complex functions. The proliferation of services for mobile devices has spawned increased user desire for the ability to access such services on a single integrated device. Many voice-based services are designed for use with a telephone keypad and numeric entry, whereas many data-based services are designed for use with a QWERTY keyboard and text entry.

As such, users with a device having a telephone keypad are made to compromise when using data-based services, and users with a device having a QWERTY keyboard are made to compromise when using voice-based services. Users have a desire to use such services on a device that is easily held and carried, and has a form factor that facilitates ease of use when entering either text or numbers.

BRIEF DESCRIPTION OF THE DRAWINGS

Embodiments of the present invention will now be described, by way of example only, with reference to the attached Figures, wherein.

DETAILED DESCRIPTION

Generally, a dial keypad for use with a mobile device having a keyboard is provided. The keypad has a push-through, hinge-spring design that activates only one of two keyboard keys underlying a dial key and allows backlighting transmissivity. A translucent material can be used to allow the keyboard key backlighting to be coupled through to a top dial key. The keypad creates an aesthetically balanced dial keypad arrangement over a QWERTY keyboard. A preferable mechanical implementation allows backlighting and has an offset contact and spring design to activate one of the two underlying keys. This activation simplifies the software implementation for executing a dial key function since the signal is coming from one address rather than having to make a determination of whether it is coming from one or two addresses. Moreover, the resulting dial key press has a standard single click feel.

Figure 1:
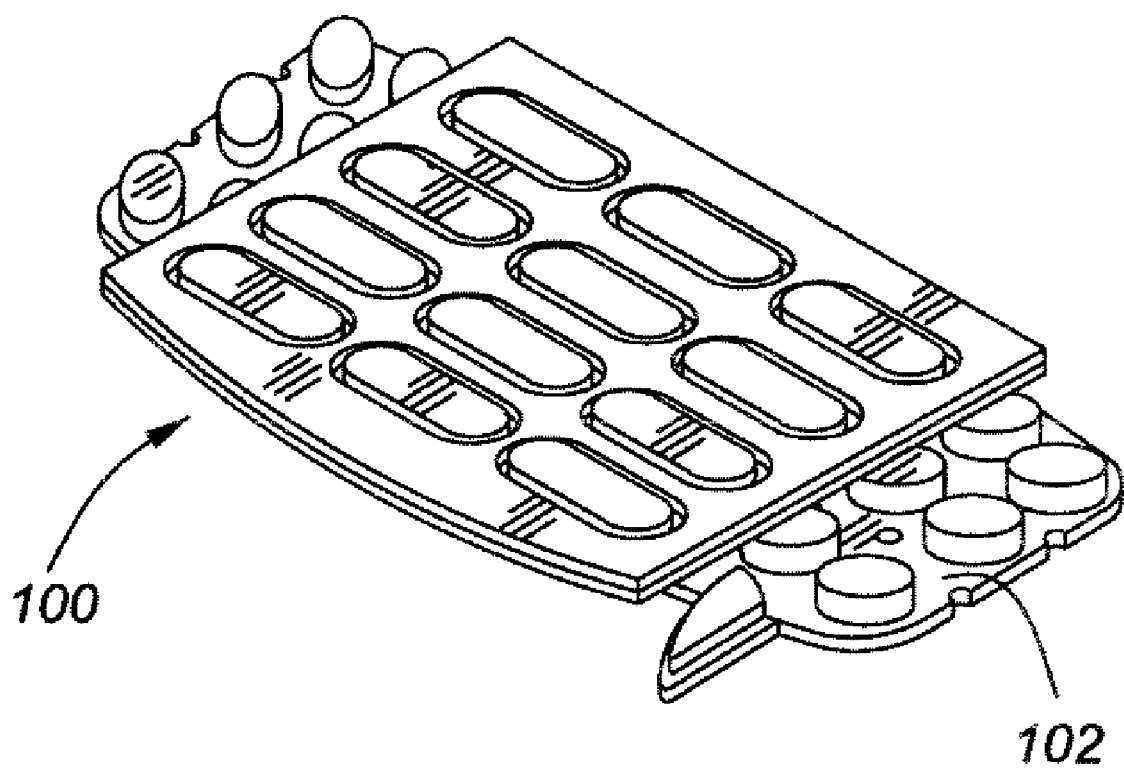
FIG. 1 is a basic representation of a mechanical assembly of a dial keypad according to an embodiment of the present invention for a mobile device having a keyboard.

FIG. 1 is a basic representation of a mechanical assembly of a dial keypad according to an embodiment of the present invention for a mobile device having a keyboard. A dial keypad actuator assembly 100 includes a plurality of dial keys. In this example, twelve dial keys are shown and are modeled flat without any surface contour. A keyboard actuator 102 is provided underneath the dial keypad actuator assembly 100. The dial keypad actuator assembly 100 is preferably housed within or joined to an enclosure or cover plate, such as a flip-cover assembly. The flip-cover assembly advantageously registers the dial keypad actuator assembly accurately over the keyboard, such as a QWERTY keyboard, in the desired manner, as will be described later. Although the description herein will refer primarily to the QWERTY keyboard layout, it is to be understood that the present invention can be used with any number of keyboard layouts, such as QWERTZ (used in Germany), AZERTY (used in France), Dvorak, and alphabetic.

This implementation is preferably wholly mechanical, requiring no electrical circuitry in the dial keypad. Appropriate software and logic are preferably provided in the mobile device in order to detect that the cover plate is closed so that actuation of particular keyboard keys is interpreted by the mobile device as a desired actuation of the particular dial key that is being pressed. For example, the proximity of a magnet in the dial keypad can be detected to determine if the cover plate is closed.

Figure 2:
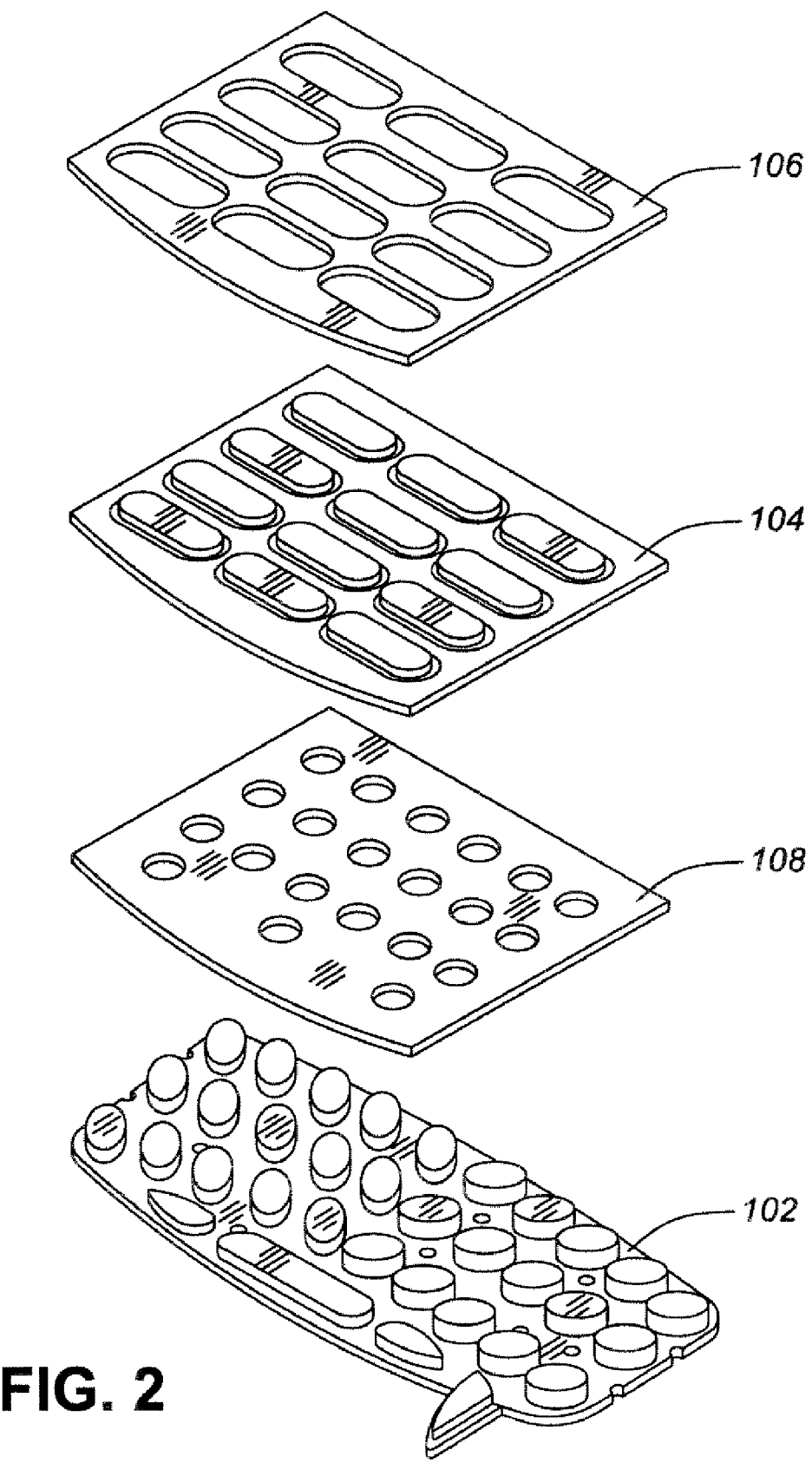
FIG. 2 is an exploded view of a dial keypad over a QWERTY keyboard.

FIG. 2 is an exploded view of a dial keypad over a QWERTY keyboard. In FIG. 2, the dial keypad actuator assembly 100 of FIG. 1 is separated into a dial key actuator 104 and a top keypad bezel 106. The dial key actuator 104, or keypad structure, is preferably constructed of molded plastic, or a composite. It is preferably also constructed of a translucent material in order to provide backlighting to the dial keys. The top keypad bezel 106 is preferably a molded plastic enclosure, and can be part of a flip-cover assembly for the mobile device. A keypad retainer 108 is also preferably provided to protect the underside of the dial key actuator 104 and provide a cushion between the dial key actuator 104 and the keyboard actuator 102. The keypad retainer 108 also serves to contain the dial key actuator 104 and captivate it with the top keypad bezel 106. The keypad retainer can also serve to cosmetically hide the keypad spring mechanism and to form a cosmetic internal housing enclosure for the flip-cover assembly. The keypad retainer 108 can be constructed of molded plastic or die-cut plastic film that can be printed and adhesive backed.

Figure 3:
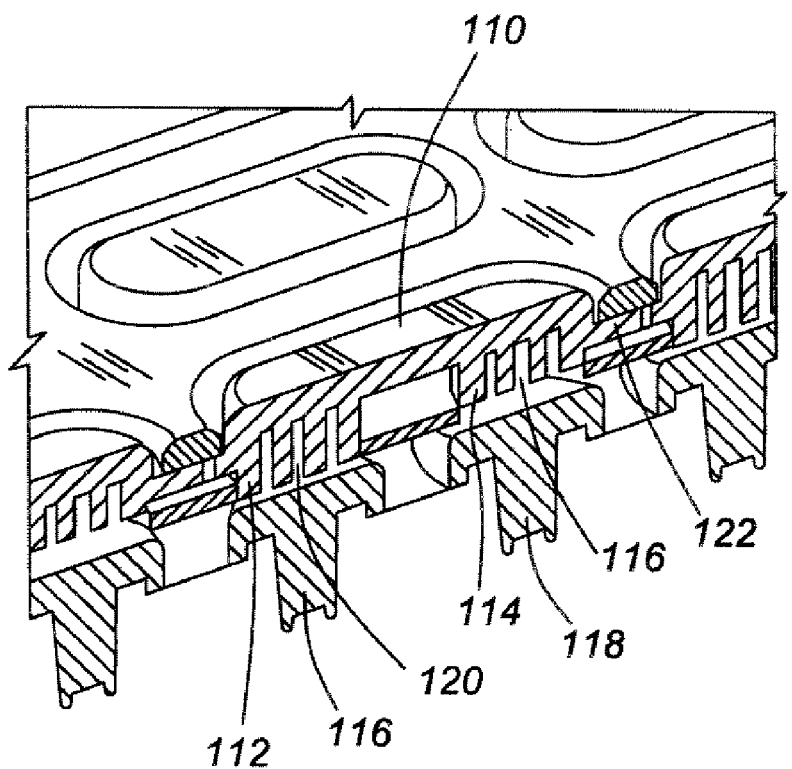
FIG. 3 is a section view detail of a dial keypad according to an embodiment of the present invention.

FIG. 3 is a section view detail of a dial keypad according to an embodiment of the present invention. Most dial keys 110 overlie, i.e. overlap and are positioned above, two underlying keyboard keys. Each of those dial keys 110 has a keyboard actuator end 112 and a non-actuating hinge end 114. The mechanical implementation is such that the dial key mechanism only activates one of the two underlying keyboard keys, such as keyboard keys 116 and 118. This activation simplifies a software implementation for executing the dial number since the signal is coming from one address rather than having to make a determination of whether it is coming from one or two addresses. Moreover, the resulting dial key press has a standard single click feel. It also permits the key layout on the dial keypad to be different than the layout of the underlying keyboard. With a simple one-to-one relationship between keys on the cover plate and keys on the keyboard, it would not be possible to have a balanced telephone keypad layout with large dial keys on the cover plate and a QWERTY keyboard layout with small closely spaced keys on the mobile device body or housing.

The view shown in FIG. 3 also provides a glimpse into how the dial keypad allows for transmission of backlighting from the QWERTY keyboard in a preferred embodiment, as well as the actuator and hinge design. Each dial key 110 has a keyboard actuator end 112 and a non-actuating hinge end 114, each of which preferably has a light pipe 120 for allowing backlighting to be transmitted from an underlying keyboard key to the dial key. The light pipe protrusion under the non-actuating end of the dial key is shorter than that under the actuator end, so that it does not activate the key underneath it when the dial key is pressed. The dial key 110 can be made from translucent material to couple backlighting from a backlighting element, for example from an electroluminescent (EL) panel beneath the keyboard keys. The backlighting technique used can alternatively incorporate light emitting diode (LED) technology, Cold Cathode Fluorescent Tube (CCFT) technology, and/or similar backlighting to illuminate the keyboard key's keycap and/or artwork on the key, such as lettering or numbering indicating the function of the key. The light pipe in each of the two ends of the dial key can be used to couple light from both the actuated keyboard key underneath the dial key and the keyboard key underneath the dial key that is not actuated. This allows for backlighting to be brought to the dial keys while retaining a natural key-pressing feel, and providing a mobile device having both a telephone keypad and a QWERTY keyboard.

Each dial key is hingedly attached to the dial key actuator, or keypad structure, by way of a hinge 122. An internal leaf spring design allows the dial key to rock or rotate to facilitate the activation of a protrusion detail over a QWERTY keycap. The complete hinge design is such that the motion of the depressed key has a bias towards pressing the target activation key underneath and clearing, i.e. not activating, the second underlying key. Different examples of such a hinge design will be discussed later in relation to FIGS. 5 and 6.

Figure 4:
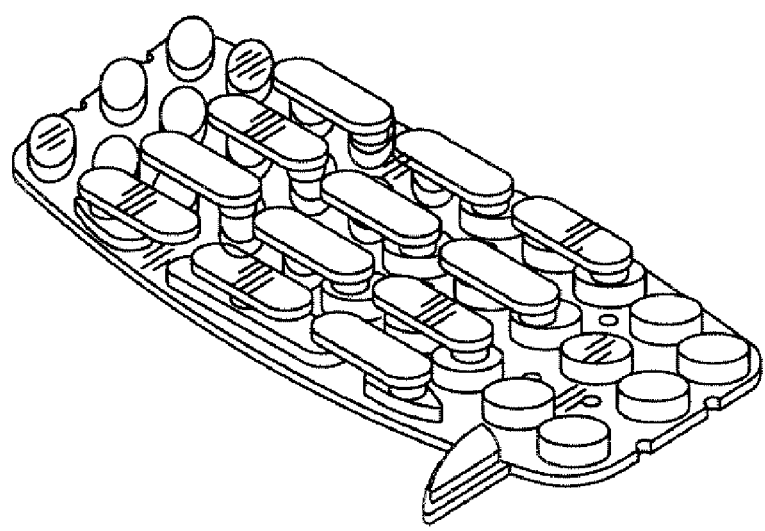
FIG. 4 is a simplified view of a dial keys positioned on top of keyboard keys according to an embodiment of the present invention.

FIG. 4 is a simplified view of dial keys positioned on top of keyboard keys according to an embodiment of the present invention. This figure illustrates the fact that different dial keys can have their actuating end and hinge end on different sides from each other, and that some can even have the hinge on the bottom. Also, one of the keys shown in FIG. 4 only overlaps one key, since the underlying key is the spacebar key, which is larger in width than most other keys. As such, in embodiments of the present invention it is not necessary to have every single dial key overlapping more than one underlying keyboard key.

Figure 5A:
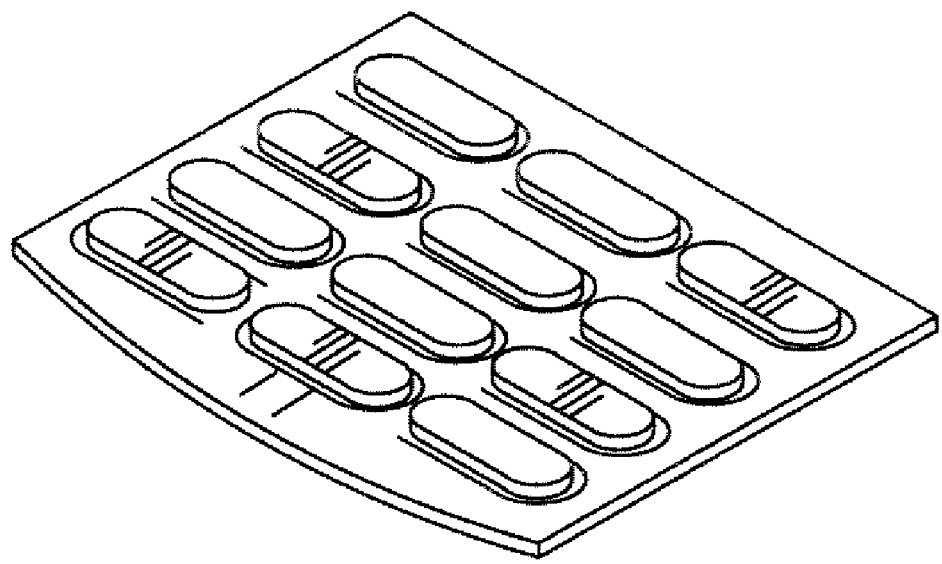
FIG. 5A is a perspective view of a dial key actuator having a first hinge design and showing the top surface of the dial keys.

FIG. 5A is a perspective view of a dial key actuator having a first hinge design and showing the top surface of the dial keys. In this first spring hinge design, the hinge is provided on a side of the dial key. Some keys have the hinge end on one side, while others have the hinge end on a different side. FIG. 5A illustrates the center dial key on the bottom row as having a spring hinge in its center. For those keys having a spring hinge on the side of the dial key, the key press actuation underneath is typically on the side opposite the hinge. This spring hinge design allows the keys to flex. A translucent material can be used to allow backlighting from the underlying keyboard to illuminate the dial keys.

Figure 5B:
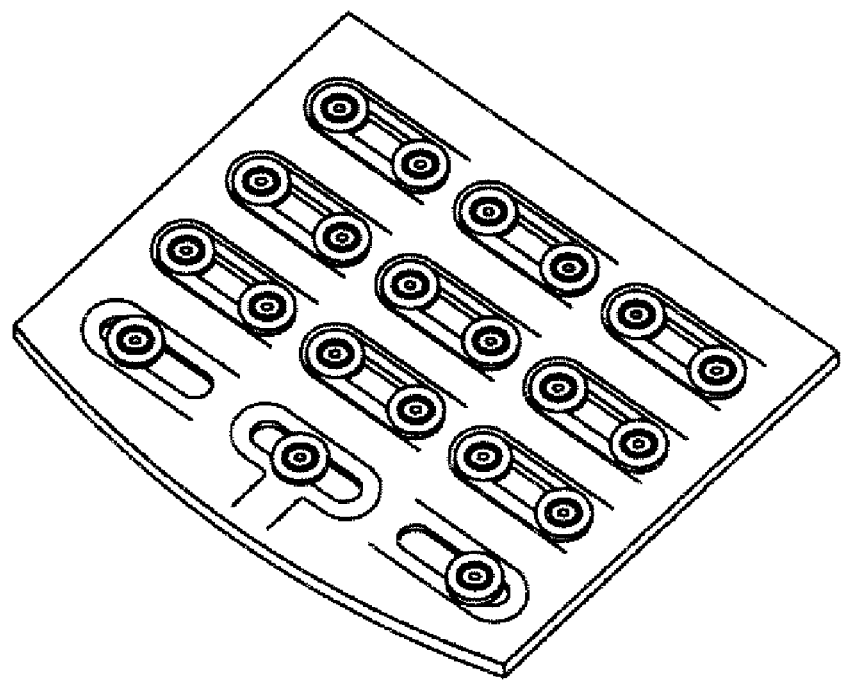
FIG. 5B is a perspective view of a dial key actuator having a first hinge design and showing the bottom surface of the dial keys.

FIG. 5B is a perspective view of a dial key actuator having a first hinge design and showing the bottom surface of the dial keys. On most of the keys, the mechanical actuator is shown on the opposite side of the spring hinge, with a light pipe preferably provided on each side for transmitting the backlighting from the keyboard keys below to the dial key. However, not all of the keys are required to have such a design. For example, the side keys in the bottom row each only have a light pipe on the actuator side of the dial key, while the center key in the bottom row has an actuator in its center, as opposed to on a side. Typically, the spacebar key would be underneath these keys. The spacebar key typically only has backlighting in its center portion and would typically span a good portion of the bottom row of dial keys, which reduces the need for extra light pipes on non-actuating ends of the dial keys above it.

Figure 6A:
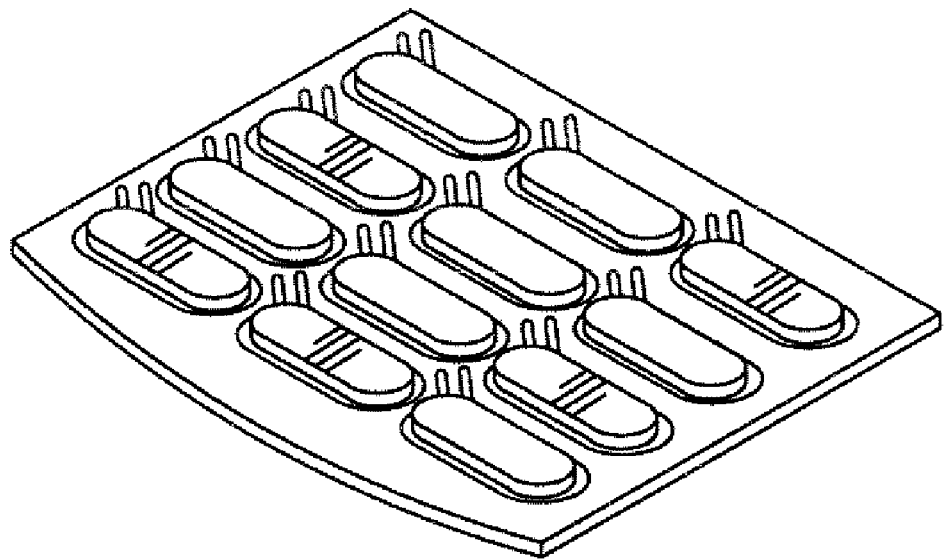
FIG. 6A is a perspective view of a dial key actuator having a second hinge design and showing the top surface of the dial keys.
Figure 6B:
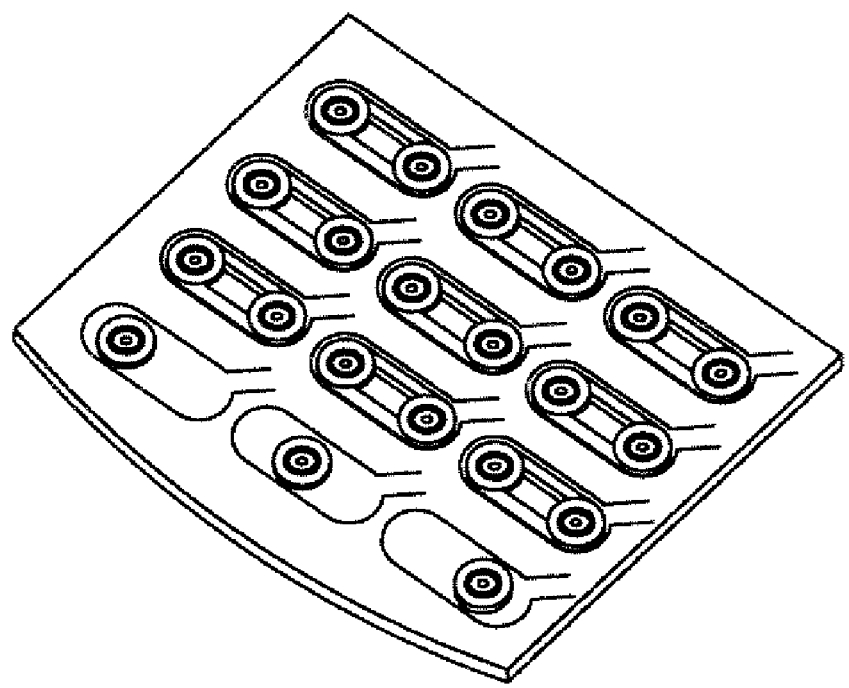
FIG. 6B is a perspective view of a dial key actuator having a second hinge design and showing the bottom surface of the dial keys.

FIG. 6A is a perspective view of a dial key actuator having a second hinge design and showing the top surface of the dial keys. This second spring hinge design is an angled key cut option. In this second design, the hinge (rotation) point is moved farther away from the actuator contact location. This produces a more linear feel with less rotation, or rocking action, than the first spring hinge design. However, this second design is more complex to manufacture than the first, more simple, hinge design. Moreover, the added human factor benefit of "key feel" may be low with only about 0.25 mm of keystroke distance in the metal dome switch. FIG. 6B is a perspective view of a dial key actuator having a second hinge design and showing the bottom surface of the dial keys. This figure simply shows the relationship between the actuator contact, non-actuating end and hinge location for the keys in this design.

Figure 7:
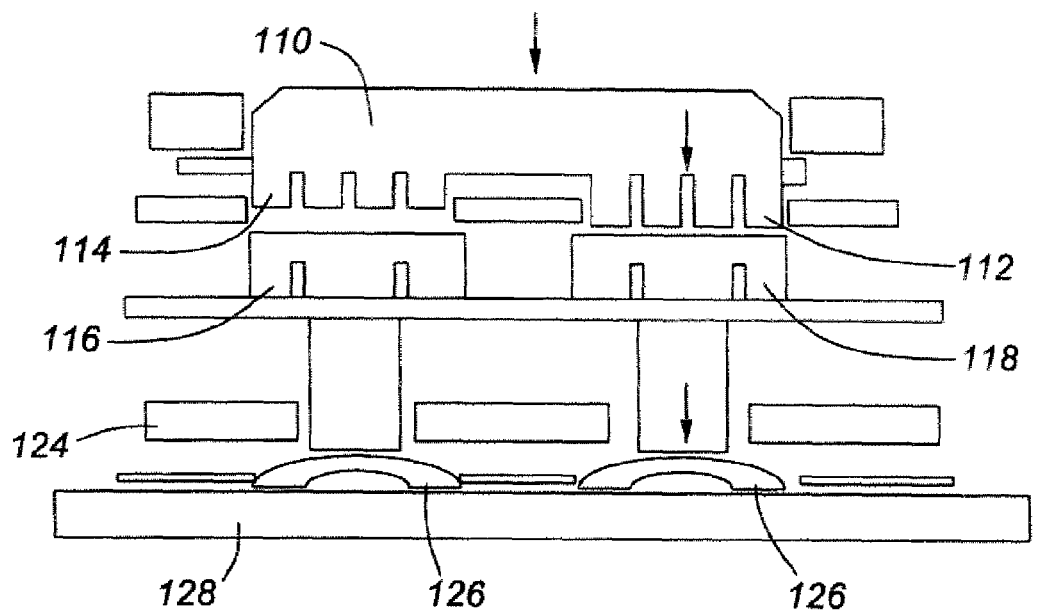
FIG. 7 is a simplified graphic view of the interaction of a dial keypad and QWERTY keyboard and other elements of a mobile device.

FIG. 7 is a simplified graphic view of the interaction of a dial keypad and QWERTY keyboard and other elements of a mobile device. As in previous figures, the dial key 110 has a keyboard actuator end 112 and a non-actuating hinge end 114, each of which has a light pipe 120 for allowing backlighting to be transmitted from underlying keyboard keys 116 and 118 to the dial key 110. FIG. 7 illustrates that each of the underlying keyboard keys can also have light pipes, or similar openings or other means, for transmitting light from underlying electroluminescent (EL) panel 124 or similar backlighting element. Each of the keyboard keys actuates a contact 126, such as a dome switch as illustrated, which is connected to a printed circuit board, or PCB main board, 128 of the mobile device.

Figure 8:
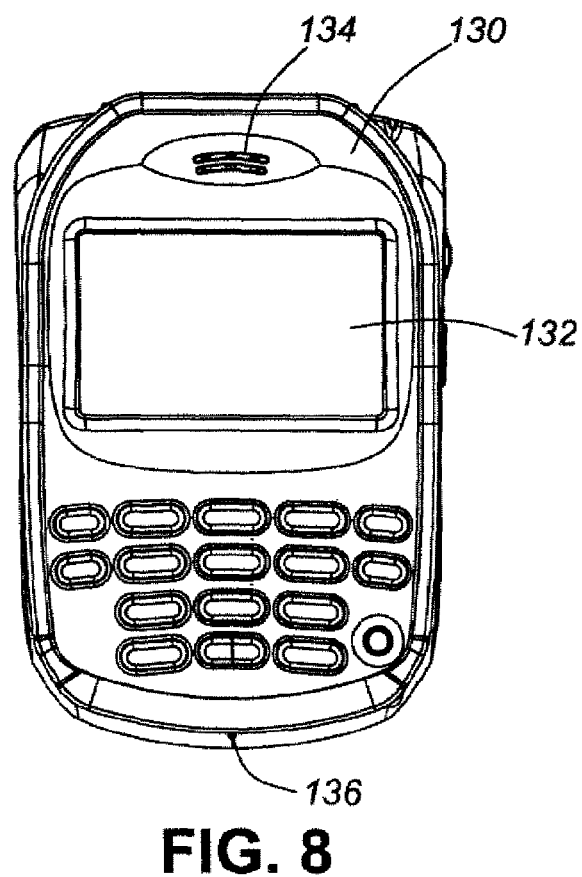
FIG. 8 is a front view of a mobile device with a cover plate incorporating a dial keypad according to an embodiment of the present invention.

FIG. 8 is a front view of a mobile device with a cover plate incorporating a dial keypad according to an embodiment of the present invention. Cover plate 130 is advantageously hingedly attached to the mobile device, preferably at a side thereof. The cover plate 130 includes a display area 132, an earpiece, or speaker, area 134 and a microphone area 136. In a presently preferred embodiment, the mobile device itself has a display, earpiece speaker and microphone, and the cover plate 130 simply includes suitable openings to access those portions of the mobile device through the cover plate. Alternatively, the cover plate itself can have one or more of these features incorporated therein.

The cover plate 130 can be attached to the mobile device in a number of advantageous manners. In general, the cover plate is attached to the mobile device, or more particularly to the housing of the mobile device, so that it is movable between an operating position and a non-operating position. The cover plate can be hingedly attached to the mobile device, either at the top or at one of the sides of the mobile device. The cover plate may instead be rotatably attached to the mobile device, whereby the cover plate rotates such that it can be seated on the back of the mobile device when not in use. This typically involves some sort of guiding means on the mobile device and corresponding means on the cover plate. The cover plate can be attached to the mobile device in such a manner as to permit translational movement with respect to the mobile device. This typically involves a sliding action, facilitated by tracks or some other guiding means preferably disposed on the mobile device and a corresponding means, or mating structure, on the cover plate. Finally, the cover plate can be removably attached to the mobile device, such that it acts as a removable accessory to the mobile device.

The cover plate 130 protects the underlying keyboard of the mobile device from dust, grime, and inadvertent activation of the keyboard keys. Protection from inadvertent activation of the keyboard keys is enhanced by the fact that when the cover plate is in its closed position, the functions of the keyboard keys themselves are no longer available. Instead, it is the function of the dial keys that are made available to the user. As such, the cover plate provides protection of the keyboard keys from both damage and inadvertent activation. The cover plate can also include a screen protection area, such as at the display area 132, that allows viewing of the underlying screen and protects it from scratches when closed.

At the same time, the cover plate also selectively limits or changes available functions of the underlying keys. As mentioned above, the functions of the keyboard keys are largely no longer available, although some exceptions can be made, for example in the case of a power button or a similar general purpose button. However, the arrangement of the dial keys overlying the keyboard keys, when the cover plate is in its closed position, also essentially changes the functions of the keyboard keys. By providing a new interface via the dial keys, new functions are made available by the depression of the same underlying keyboard key. The simultaneous provision of protection of the keys from damage and inadvertent activation, as well as the selective limitation or changing of available functions of the underlying keyboard keys is an advantageous aspect of this embodiment of the present invention.

Preferably, the cover plate includes a keypad having a push-through, hinge-spring design that activates only one of two keyboard keys underlying a dial key and allows backlighting transmissivity. Such a design has been described in detail with respect to the previous figures. A translucent material can be used to allow the keyboard key backlighting to be coupled through to a top dial key. That preferable mechanical implementation allows backlighting and has an offset contact and spring design to activate one of the two underlying keys, as also described above.

The cover plate can alternatively include a one piece keyboard bezel and keycap design with the keys hinged along the horizontals at the bottom of each key. In this alternative design, the keycap and cover plate are integrated into one piece to produce a thinner design than the composite assembly of multiple parts. Each key would still have an actuating end and a non-actuating end as described above. The user may sense a stiffer feel when the keycap, or dial key, is pressed or actuated with this integrated design as compared to the multiple part design described above.

Therefore, it can be seen that embodiments of the present invention provide a mobile device having both a telephone keypad and QWERTY keyboard. Some dial keys in the telephone keypad overlie at least two underlying keyboard keys and actuate only one of those keyboard keys. The actuation of only one underlying keyboard key simplifies the software implementation for executing a dial key function since the signal is known to come from only one address. It also permits the keys in the keypad to have a different layout than the underlying keyboard layout. The dial keys also preferably have light pipes for coupling backlight from the two underlying keyboard keys.

The above-described embodiments of the present invention are intended to be examples only. Alterations, modifications and variations may be effected to the particular embodiments by those of skill in the art without departing from the scope of the invention, which is defined solely by the claims appended hereto.

For example, although described above in the context of a telephone dial keypad and a QWERTY keyboard, keypads in accordance with aspects of the present invention are applicable to other functions than providing telephone keypad functionality.

What is claimed is:

1. A cover plate for use with a mobile device, the mobile device having a keyboard including a plurality of keyboard keys, the cover plate comprising:
   a keypad frame mounted on said mobile device and user-movable between a first position away from said keyboard and keyboard keys and a second position overlying said keyboard and keyboard keys; and
   a plurality of dial keys depressably mounted on the keypad frame;
   wherein each of the plurality of dial keys includes a hinged portion so that each of the dial keys can actuate one of said keyboard keys when said cover plate is in said second position.

2. The cover plate of claim 1 wherein each of the plurality of dial keys includes an actuating end and wherein the hinged portion is a non-actuating hinged end.

3. The cover plate of claim 2 wherein the hinged portion is a spring hinge.

4. The cover plate of claim 1 wherein the hinged portion is located at an angled key cut.

5. The cover plate of claim 1 wherein the hinged portion is a spring hinge.

6. The cover plate of claim 1 wherein the cover plate is handedly attached to a housing of the mobile device.

7. The cover plate of claim 1 wherein the cover plate is rotatably attached to a housing of the mobile device.

8. The cover plate of claim 1 wherein the cover plate is attached to a housing of the mobile device so as to permit translational movement with respect to the mobile device.

9. The cover plate of claim 1 wherein the cover plate is removably attached to a housing of the mobile device.

10. The cover plate of claim 1, in combination with said mobile device, said mobile device having means for sensing whether or not said keypad frame is in said second position overlying said keyboard and keyboard keys.

* * * * *

UNITED STATES PATENT AND TRADEMARK OFFICE
CERTIFICATE OF CORRECTION

PATENT NO. : 7,627,335 B2 Page 1 of 1
APPLICATION NO. : 11/536268
DATED : December 1, 2009
INVENTOR(S) : Roman Peter Rak et al.

It is certified that error appears in the above-identified patent and that said Letters Patent is hereby corrected as shown below:

Column 6, line 45, delete "handedly" and insert therefor --hingedly--.

Signed and Sealed this

Ninth Day of February, 2010

David J. Kappos
*Director of the United States Patent and Trademark Office*

UNITED STATES PATENT AND TRADEMARK OFFICE
CERTIFICATE OF CORRECTION

PATENT NO.      : 7,627,335 B2                                        Page 1 of 1
APPLICATION NO. : 11/536268
DATED           : December 1, 2009
INVENTOR(S)     : Rak et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 288 days.

Signed and Sealed this

Twenty-first Day of December, 2010

David J. Kappos
*Director of the United States Patent and Trademark Office*